United States Patent
Massey

[15] 3,691,882
[45] Sept. 19, 1972

[54] THREADED PIPE JOINT FACING TOOL

[72] Inventor: Dulas L. Massey, 1914 Ballantine, Houston, Tex. 77034

[22] Filed: March 18, 1971

[21] Appl. No.: 125,779

[52] U.S. Cl. .................................................82/4 C
[51] Int. Cl. ............................B23b 3/22, B23b 5/04
[58] Field of Search ...............................82/4 C, 70.2

[56] References Cited

UNITED STATES PATENTS 2,211,183  8/1940  Tytus et al. ...................82/4 C
3,181,398  5/1965  Rogers ...........................82/4 C

*Primary Examiner*—Harrison L. Hinson
*Attorney*—James F. Weiler, Jefferson D. Giller, William A. Stout, Paul L. De Verter, II, Dudley R. Dobie, Jr. and Henry W. Hope

[57] ABSTRACT

A threaded pipe joint facing tool for refacing the shoulders of threaded pipe joints by providing a tool that moves a cutting tool radially around the tool joint axis and perpendicular to the tool joint axis at the same time for refacing a tool joint perpendicular to the joint axis. A support having internal threads for aligning the facing tool with the axis of a threaded tool joint and with a first tapered slide which when rotated about a lead screw mandrel moves longitudinally to move a second coacting tapered slide transversely to the tool joint axis carrying a cutting tool which moves radially around and perpendicular to the tool joint axis to reface the tool joint shoulder. The cutting means being adjustably supported from the second slide for longitudinal movement for selecting the amount of cut to be made. The cutting tool including a cutting edge for cutting a groove for use as an O ring groove and/or stress relief groove adjacent the tool joint shoulder. An adapter having threads on each end for supporting the facing tool for refacing the shoulders of the box end of the tool joint.

10 Claims, 9 Drawing Figures

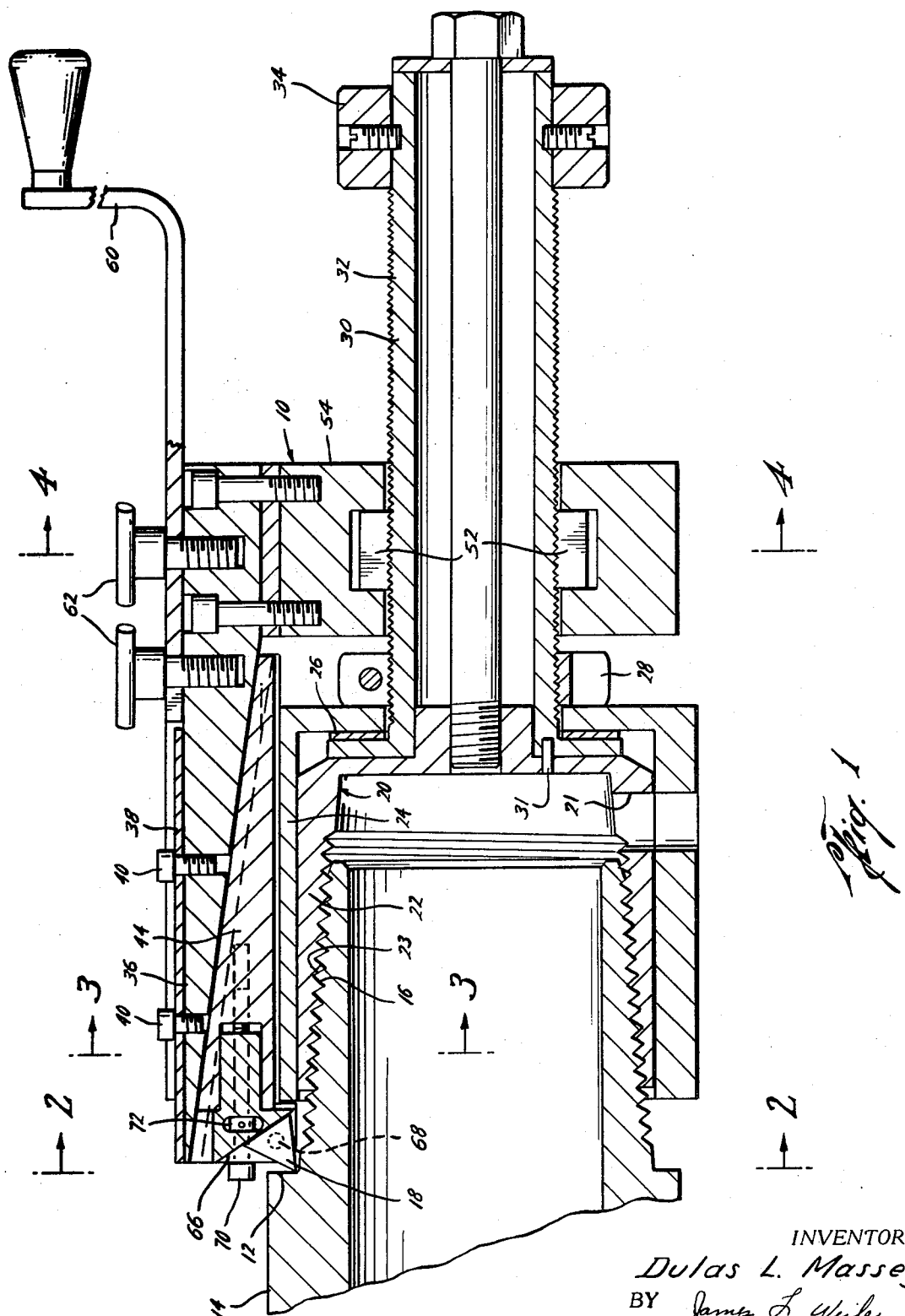

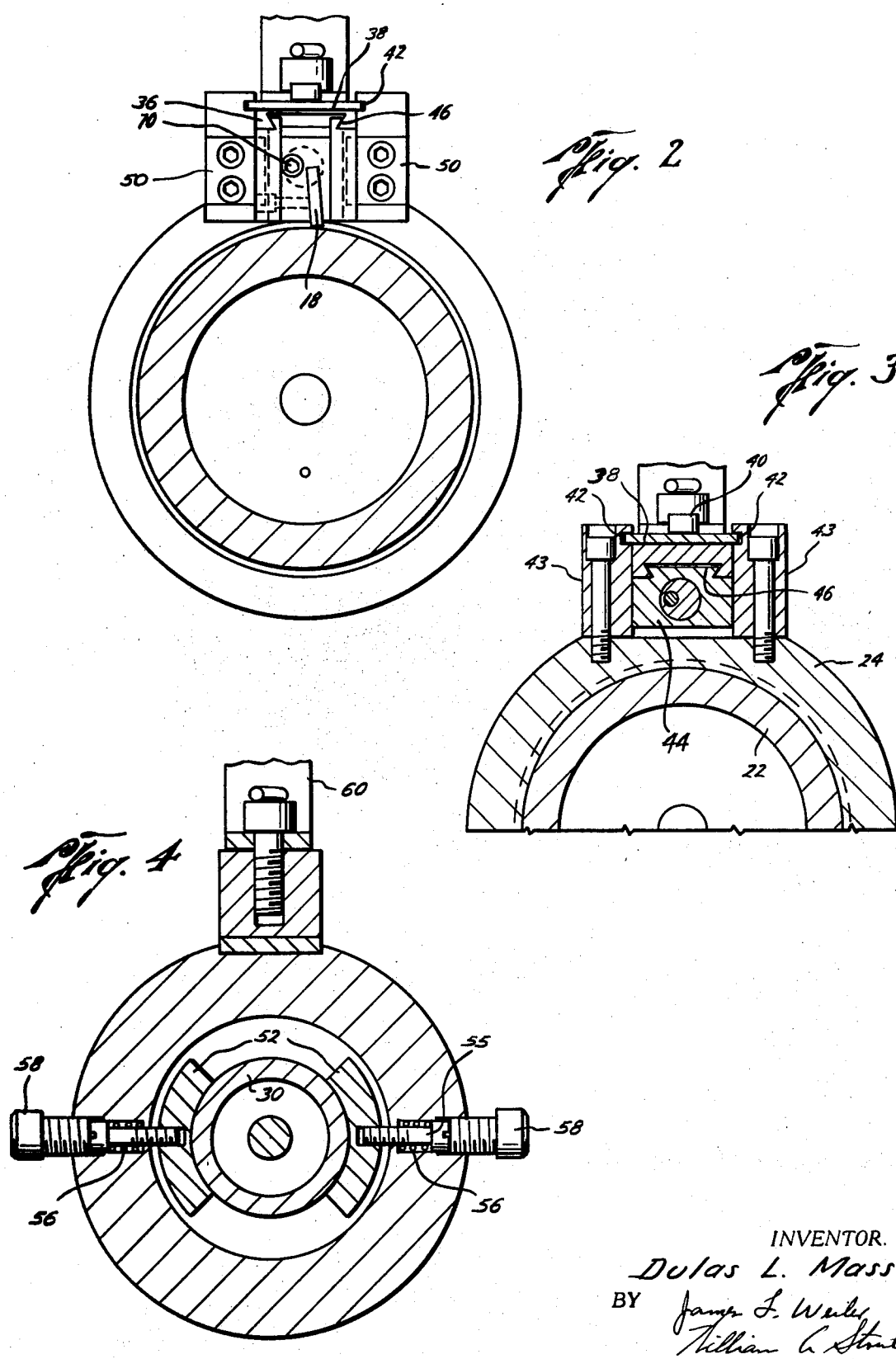

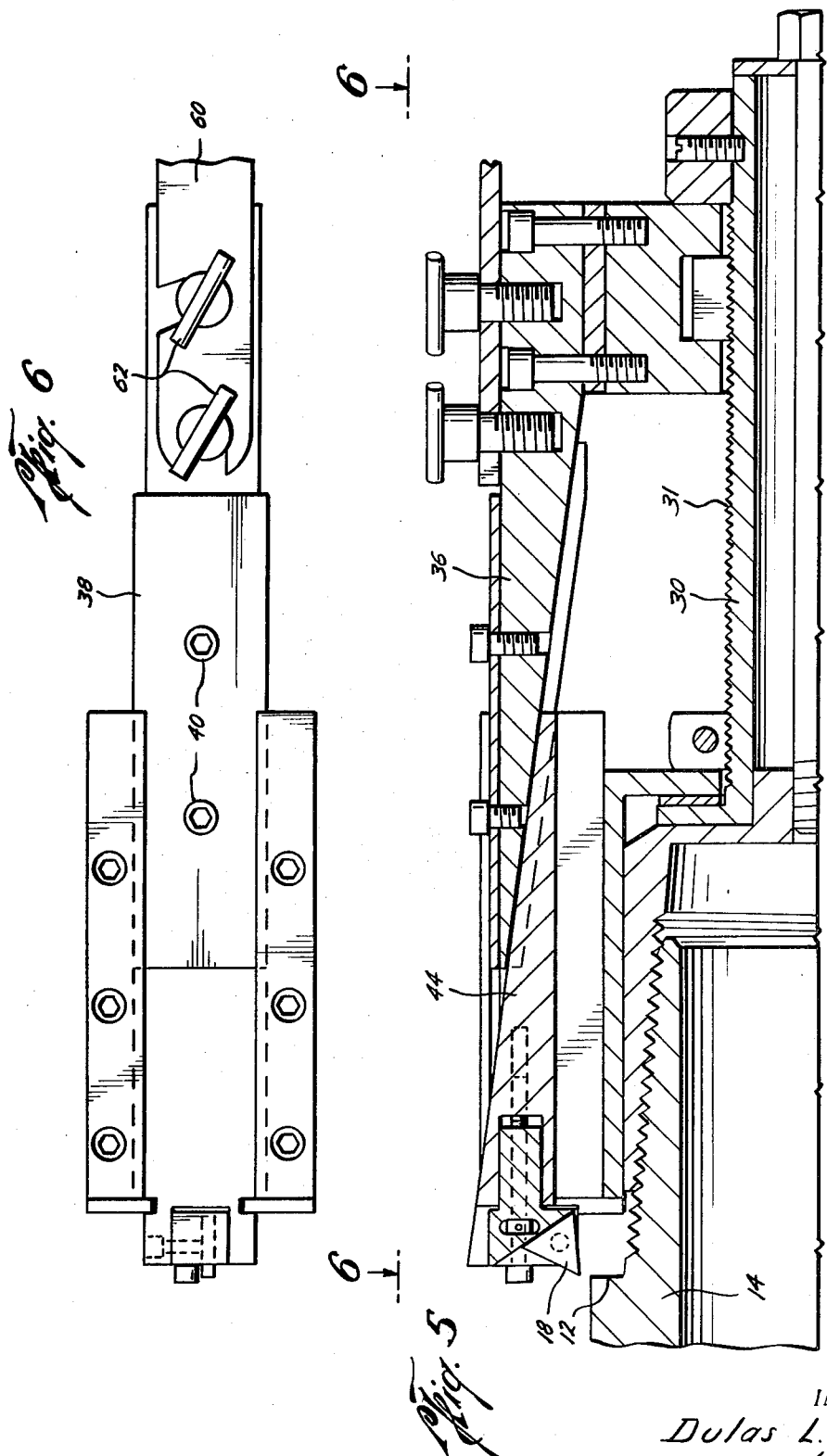

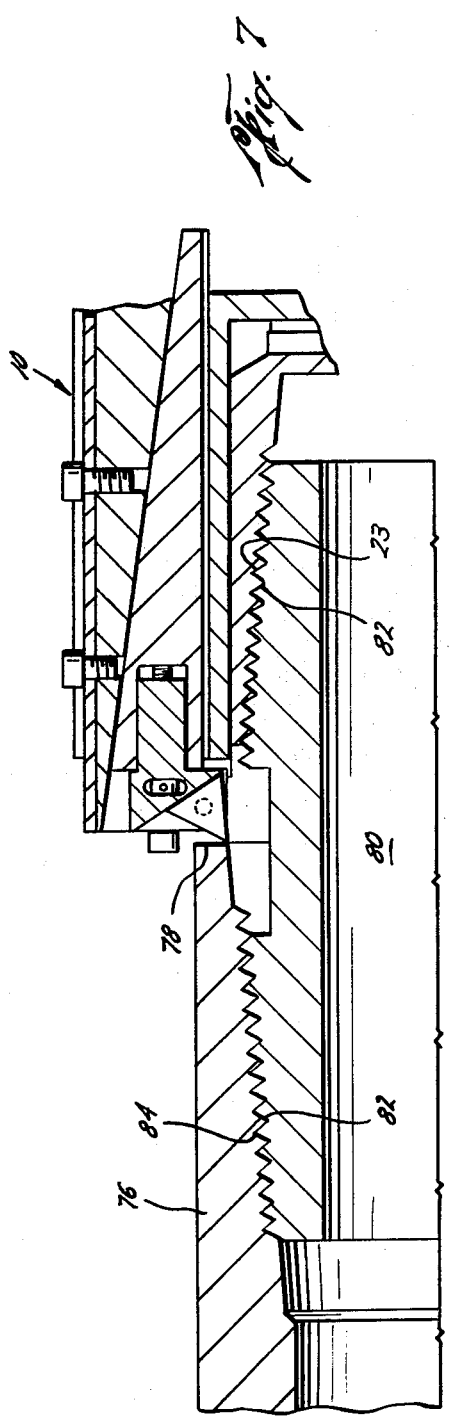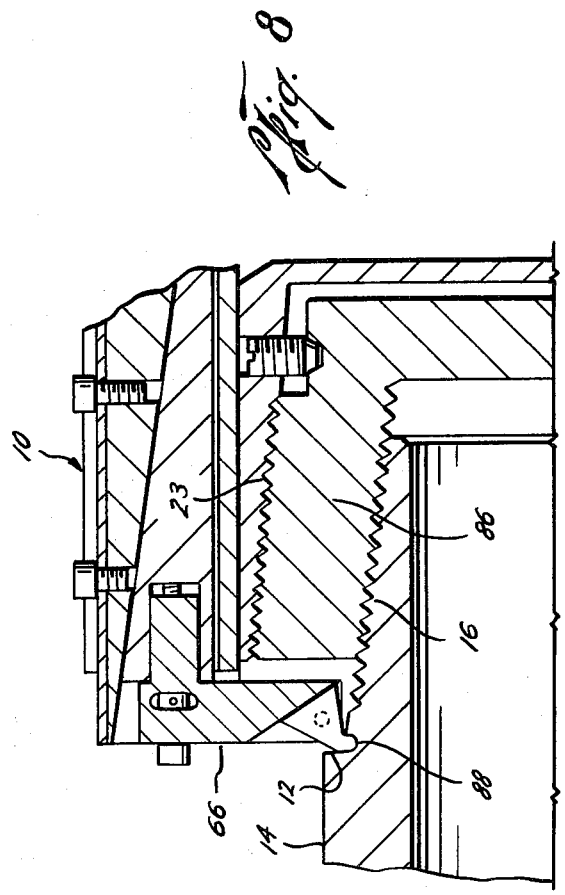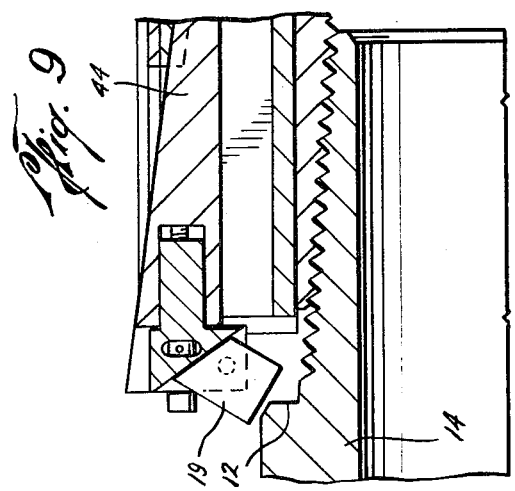

THREADED PIPE JOINT FACING TOOL

BACKGROUND OF THE INVENTION

Generally, threaded pipe tool joints such as drill pipe have a coacting shoulder on both the pin end and the box end of the joint which abut each other when the threaded joint is made up to provide a metal-to-metal seal for the joint. However, when the shoulders have been damaged the joint will leak. In the past, the damaged shoulders of a threaded tool joint have been returned to a machine shop for refacing. However, such a procedure is expensive. Other attempts at solving the problem of repairing damaged tool joint shoulders on the job site and at storage yards has been made by using sanding discs and various filing tools which did not reface the tool joint shoulders exactly perpendicular and square to the joint axis and were therefore ineffective.

The present invention is directed to a facing tool for refacing the shoulders of a threaded pipe joint by a portable tool in which a selected amount of refacing can be made and accurately controlled and the refacing can be made accurately and perpendicular to the joint axis to insure a satisfactory joint between the joint shoulders.

SUMMARY

The present invention is directed to a facing tool for a threaded pipe joint which is portable and which carries a cutting tool radially around the tool joint axis and perpendicular to the tool joint axis at the same time for refacing the tool joint shoulders.

A further object of the present invention is to provide a facing tool having a support with internal threads for aligning the tool with the threads on a threaded tool joint with a mandrel having a lead screw supported coaxially of the support and a first tapered slide which is rotatably supported from the support and connected to the lead screw for longitudinal movement when rotated, and a second tapered slide slidably coacting with the first slide but prevented from moving longitudinally so that it is moved transversely as the first slide is moved longitudinally, and a cutting tool carried by the second slide for refacing the shoulder of the joint as the first slide is rotated.

A still further object of the present invention is to provide a tool for cutting a groove for use as an O ring groove and/or a stress relief groove at the shoulder of the tool joint by providing a cutting tool having a cutting edge shaped for cutting the groove.

A still further object of the present invention is to provide a facing tool which includes an adapter having threads on each end for threadedly engaging the threads on the box end of a tool joint and supporting the facing tool from threads on the second end for refacing the shoulder of the box end of the tool joint.

Yet a still further object of the present invention is the provision of a portable hand operated facing tool for performing facing operations in the field and in which the cutting means is adjustably supported for cutting only the necessary amount of the shoulder to provide a satisfactory seal between abutting shoulders.

Other and further features and advantages will be apparent from the following description of a preferred embodiment of the present invention.

BRIEF DESCRIPTION OF THE DRAWINGS

FIG. 1 is an elevational view, in cross section, of the present invention in position refacing the shoulder of the pin end of a pipe joint, FIG. 2 is a cross-sectional view taken along the line 2—2 of FIG. 1, FIG. 3 is a cross-sectional view, in half section, taken along the line 3—3 of FIG. 1, FIG. 4 is a cross-sectional view taken along the line 4—4 of FIG. 1 but rotated 90°, FIG. 5 is a fragmentary cross-sectional view, in half section of the apparatus of FIG. 1 with the facing tool in the retracted position, FIG. 6 is a cross-sectional view taken along the line 6—6 of FIG. 5, FIG. 7 is a fragmentary cross-sectional view of the present invention shown in use in refacing the shoulder of the box end of a tool joint by use of an adapter, FIG. 8 is a fragmentary elevational view, in cross section, illustrating the present invention in use in refacing a shoulder of a pin of a different size and an O ring groove by using an adapter, and FIG. 9 is a fragmentary cross-sectional view in half section of the apparatus of FIG. 1 showing use of a shoulder beveling tool.

DESCRIPTION OF THE PREFERRED EMBODIMENT

Referring now to the drawings, and particularly to FIGS. 1–6, the reference numeral 10 generally indicates the facing tool of the present invention in use for facing a shoulder 12 on a conventional pin portion 14 of a threaded pipe joint having conventional threads 16. The present facing tool 10 is directed to move a cutting tool 18 radially around the longitudinal axis of the pin 14 and simultaneously perpendicular to the longitudinal axis of the pin 14 to cut across and reface the shoulder 12 of the pin 14.

Thus a support 20 is provided having a first member 22 having internal threads 23 for aligning the tool 10 with the axis of the pin 14 such as by coacting with threads 16 on the pin 14. The support 20 also includes a second member 24 rotatable on the first threaded member 22 and includes a bearing 26 therebetween and held in position by a collar 28. Thus, the support 20 is coaxially aligned with a longitudinal axis of the pin 14 so as to allow the threading tool 18 to face the shoulder 12 exactly perpendicular to the axis of the pin 14.

A mandrel 30 is provided which is connected to the support 20 and supported coaxially therefrom and locked against rotation by a pin 31. The mandrel 30 includes a lead screw 32 and a stop collar 34.

A first slide member 36 is provided which includes a slide plate 38 held in place by screws 40. The slide plate 38 moves in slots 42 in slide retainers 43 (FIG. 3) which are bolted to support member 24 and support the slide 36 from the rotatable support member 24. The slide 38 and coacting slots 42 are axially aligned with the axis of the mandrel 30 and thus with the axis of pin 14 thereby allowing the slide 36 to move longitudinally but not transversely. A second tapered slide 44 is provided which is slidably connected to the first slide member 36 by a dovetail joint 46. However, holding plates 50 are provided on the slide retainers 43 and engage the second slide 44 for preventing longitudinal movement of the slide 44. Thus, as the first slide member 36 is longitudinally moved, the second slide member 44, because of the coacting dovetail tapered surfaces 46, will move transversely to the axis of the pin 14 carrying the cutting tool 18.

The first tapered slide 36 is connected to the lead screw 32 on the mandrel 30 by means of the lead nuts 52 through a lead nut housing 54. Thus referring to FIGS. 1 and 4, the lead nuts 52 are connected to a pin 55 which will yieldably hold lead nuts 52 in a retracted position away from the lead screw 32 of the mandrel 30 by a spring 56. Thus the lead nuts 52 may be released from the lead screw 32 by releasing thumb screws 58 for moving the housing 54 and the first slide 36 to the desired position by ratcheting the lead nuts 52 across the lead screw 32. And when it is desired to fully engage the lead nuts 52 the thumb screws 58 are actuated to bring the nuts 52 into firm engagement with the lead screw 32. Of course, as the lead screw housing 54 is rotated, the lead screw housing 54 and the first tapered slide 36 will be simultaneously rotated and moved longitudinally in accordance with the pitch of the lead screw 32. And as the first tapered slide 36 is rotated and longitudinally moved, the second tapered slide 44 will be rotated and moved transversely toward the axis of the pin 14, but will not be moved longitudinally since it is held by the holding plates 50. Any suitable means may be used for rotating the lead nut housing 54 and the first slide 36 such as a handle 60 secured to the top of the tapered slide 36 by pins 62.

Thus, in its initial position, as best seen in FIG. 5, the first slide 36 is retracted and the second slide is positioned outwardly with the cutting tool 18 out of contact with the shoulder 12 on the pin 14. And as best seen in FIG. 1, as the handle 60 is rotated the first tapered slide 36 is moved longitudinally moving the second tapered slide 44 downwardly carrying the cutting tool 18 across the face of shoulder 12 thereby refacing the shoulder.

The cutting tool 18 is secured to a tool holder 66 by a screw 68. The tool holder 66 is secured to the second tapered slide 44 by an adjustable screw 70 which is threadedly connected to the slide 44 and includes a collar 72 which engages the tool holder 66 for longitudinally moving the tool holder 66 and thus the tool 18 a desired longitudinal amount. Thus, by adjusting the screw 70 the amount of the cut taken by the cutting tool 18 may be suitably adjusted. Preferably, the cutting tool 18 has three edges which may be interchanged as one wears out to insure a sharp cutting edge.

The facing tool 10 of the present invention, as best seen in FIGS. 1–6, is shown refacing the shoulder of a pin 14 of a threaded tool joint. In addition, the facing tool 10 may, as best seen in FIG. 7, may similarly face the shoulder of a box end 76 of a tool joint having a shoulder 78 by providing an adapter 80 which includes identical threads 82 on each end. Thus, the threads on one end of the adapter 80 are threadedly engaged into the threads 84 in the box and the second end of the adapter 80 supports the threads 23 of the tool 10 in axial alignment with the axis of the box 76 for refacing the shoulder 78.

And, as best seen in FIG. 8, the facing tool 10 of the present invention may be used to face difference sized pipe by using a thread adapter 86 with appropriate sized tool holder 66 such as shown therein which is adapted to be threaded onto the threads 16 of pin 14 and also coact with the threads 23 of the facing tool 10 to hold the tool 10 axially aligned with the axis of the pin 14. In addition, as best seen in FIG. 8, the cutting tool 18 may include a cutting surface 88 for cutting a groove for use as an O ring groove and/or a stress relief groove adjacent the bottom of the tool joint shoulder 12. The installation of an O ring plus refacing of the tool joint shoulder 12 will greatly add to the sealing characteristics of a rotary shoulder tool joint connection. In addition, the O ring groove will serve as a stress relief groove thus greatly reducing the possibility of a fatigue failure developing at the tool joint pin shoulder.

Referring now to FIG. 9, the present apparatus may also carry a cutting tool 19 for forming a bevel on the shoulder 12 after facing the shoulder 12. In use, the support 20 may be screwed on the threads 16 of the tool joint 14 by use of a bar inserted through opening 21 of the support 20 by holding the pin 14 secured such as by use of back-up tongs. The thumb screws 58 (FIG. 4) are loosened and the half nut housing 54 is moved back to the collar 34. This will retract the upper slide 36 and move the second slide 44 outwardly along with the cutting tool 18 to a position outside the diameter of the tool joint, as best seen in FIG. 5. If the cutting tool 18 has not yet been inserted, it may be inserted in the tool holder and secured by the screw 68. After the thumb screw 58 has been engaged to tighten the nuts 52 on the lead screw 32, the cutting tool 18 may be set to the desired cutting depth by the adjustable screw 70, preferably 0.005 inches by calibration lines on the screw 70. Thus, rotation of the handle 60 will move the lead nut housing 54 and the upper slide 36 along the lead screw 32, and move the second slide 44 transversely carrying the cutting tool 18 across as well as around the face of the shoulder 12. The amount of the transverse movement will of course depend upon the pitch of the lead screw 32 and the taper of the dovetail slidable connection 46. When the cutting tool reaches the end of the shoulder 12, rotation of the apparatus 10 is stopped, the thumb screws 58 are loosened and the lead nut housing 54 is pulled back again to the collar 34. The tool joint face 12 is checked and if further facing is necessary, the above procedure is repeated until a satisfactory face is achieved.

If it is desired to reface the shoulder of the tool joint box 76, as best seen in FIG. 7, the adapter 80 is used. And for smaller sized pins, the adapter 86 with appropriate tool holder 66 as shown in FIG. 8 may be utilized. And if an O ring groove is desired, a cutting tool having an O ring cutting surface 88, as best seen in FIG. 8, may be utilized. And as shown in FIG. 9, cutting tool 19 may be used to bevel the top of a shoulder after facing the shoulder.

The present invention, therefore, is well adapted to carry out the objects and attain the ends and advantages mentioned as well as well as others inherent therein.

What is claimed is:

1. A threaded pipe joint facing tool for refacing the shoulders of threaded tool joints comprising, a support having internal threads for aligning the tool with the threads on a threaded tool joint, a threaded mandrel connected to the support and supported coaxially of the threaded tool joint, threaded means engaging and supported from the threaded mandrel, a first tapered slide connected to the threaded means, a second tapered slide slidably connected to the first tapered slide, holding means connected between the support and the second tapered slide for preventing axial movement of the second tapered slide but allowing movement of the second slide transverse to the joint axis, means for rotating the first slide around and along the mandrel for moving the second slide transversely and around to the tool joint axis, and a cutting tool carried by the second slide for refacing the shoulder of the joint as the rotating means is actuated.

2. The apparatus of claim 1 wherein the cutting means is adjustably supported from the second slide for longitudinal movement.

3. The apparatus of claim 1 wherein the cutting means includes a cutting edge for cutting a ring groove adjacent the tool joint shoulder.

4. The apparatus of claim 1 including, an adapter having threads on each end, one end for threadedly engaging the threads on the box end of a tool joint and the second end of the adapter supporting the facing tool for refacing the shoulder of the box end.

5. The apparatus of claim 1 wherein the first slide is slidably supported from the support by coacting axially aligned means.

6. A threaded pipe joint facing tool for refacing the shoulders of threaded tool joints comprising, a support having internal threads for aligning the tool with one end of a threaded tool joint, a mandrel connected to the support and supported coaxially of the threaded tool joint and having a threaded lead screw thereon, a first tapered slide slidable rotatably supported from the support by coacting axially aligned slide means, a second tapered slide slidably connected to the first slide by a dovetail connection, holding means connected between the support and the second slide for preventing axial movement of the second slide but allowing movement of the second slide transversely to the joint axis, threaded means engaging and supported from the lead screw on the mandrel and connected to the first slide, means for rotating the first slide around and along the mandrel and for moving the second slide around and transversely to the tool joint axis, and a cutting tool carried by the second slide for refacing the shoulder of the joint as the rotating means is actuated.

7. The apparatus of claim 6 wherein the cutting means is adjustably supported from the second slide for longitudinal movement.

8. The apparatus of claim 7 wherein the cutting means includes a cutting edge for cutting a groove adjacent the tool joint shoulder.

9. The apparatus of claim 6 including, an adapter having threads on each end, one end for threadedly engaging the threads on the box end of a tool joint and the second end of the adapter supporting the facing tool in axially alignment with the tool joint for refacing the shoulder of the box end.

10. The apparatus of claim 6 wherein the cutting means includes a cutting surface for cutting a bevel on a joint.

* * * * *